(12) United States Patent
Huang et al.

(10) Patent No.: US 12,213,412 B2
(45) Date of Patent: Feb. 4, 2025

(54) METHOD FOR MICRO-RIDGE MIXED-SOWING CULTIVATION OF RICE

(71) Applicant: Hunan Agriculture University, Changsha (CN)

(72) Inventors: Huang Huang, Changsha (CN); Yin Zhang, Changsha (CN); Ren Wang, Changsha (CN); Xiangsheng Gong, Changsha (CN); Zhiqiang Fu, Changsha (CN); Can Chen, Changsha (CN); Zhengjun Yu, Changsha (CN); Jingyi Li, Changsha (CN); Yugang Liang, Changsha (CN); Jiaolong Ding, Changsha (CN); Xiangjie Meng, Changsha (CN); Dan Wu, Changsha (CN); Yao Huang, Changsha (CN); Xiaolan Liao, Changsha (CN)

(73) Assignee: Hunan Agriculture University, Changsha (CN)

( * ) Notice: Subject to any disclaimer, the term of this patent is extended or adjusted under 35 U.S.C. 154(b) by 849 days.

(21) Appl. No.: 17/429,638

(22) PCT Filed: Apr. 26, 2021

(86) PCT No.: PCT/CN2021/089813
§ 371 (c)(1),
(2) Date: Aug. 10, 2021

(87) PCT Pub. No.: WO2022/028011
PCT Pub. Date: Feb. 10, 2022

(65) Prior Publication Data
US 2022/0304258 A1    Sep. 29, 2022

(30) Foreign Application Priority Data
Aug. 6, 2020 (CN) .......................... 202010782482.6

(51) Int. Cl.
*A01G 22/22* (2018.01)
*A01B 49/06* (2006.01)
(Continued)

(52) U.S. Cl.
CPC .............. *A01G 22/22* (2018.02); *A01B 49/06* (2013.01); *A01B 79/02* (2013.01); *A01C 5/064* (2013.01);
(Continued)

(58) Field of Classification Search
CPC ...... A01C 21/005; A01G 22/22; A01B 39/14; A01K 67/02
See application file for complete search history.

(56) References Cited

FOREIGN PATENT DOCUMENTS

CN    109511478 A   *   3/2019   .............. A01C 1/00
CN    111919681 A   *   11/2020   ............. A01B 39/14
(Continued)

*Primary Examiner* — Tara Mayo
(74) *Attorney, Agent, or Firm* — Bayramoglu Law Offices LLC

(57) ABSTRACT

A method for micro-ridge mixed-sowing cultivation of rice includes: S1: draining away water at the maturity stage of the preceding crop until reaching a state allowing a harvester to operate; S2: harvesting the preceding crop, leaving the stubble, smashing the stalks of the preceding crop, and then spreading the smashed stalks on the stubble to form a rhizosphere layer for rice growth; S3: trenching the field to form ecological trenches; S4: flattening the standing stubble and the smashed stalks on the seedbed surface to form an underlying surface, molding seed-fertilizer-soil compounds into a ridge shape and fall the seed-fertilizer-soil compounds on the underlying surface to form ecological ridges, wherein a plurality of ecological ridges are formed between adjacent ecological trenches, and the seed-fertilizer-soil compounds
(Continued)

are obtained by thoroughly mixing rice seeds, chemical fertilizers and soil at a mass ratio of 6 to 14:50 to 70:6,000 to 10,000.

20 Claims, 1 Drawing Sheet

(51) Int. Cl.
| | | |
|---|---|---|
| | *A01B 79/02* | (2006.01) |
| | *A01C 5/06* | (2006.01) |
| | *A01C 11/00* | (2006.01) |
| | *A01C 14/00* | (2006.01) |
| | *A01C 21/00* | (2006.01) |
| | *A01G 25/00* | (2006.01) |

(52) U.S. Cl.
CPC ............ *A01C 11/003* (2013.01); *A01C 14/00* (2013.01); *A01C 21/005* (2013.01); *A01G 25/00* (2013.01)

(56) References Cited

FOREIGN PATENT DOCUMENTS

| | | | | |
|---|---|---|---|---|
| CN | 111919688 A | * | 11/2020 | ............ A01G 22/22 |
| GB | 362226 A | * | 12/1931 | ............ A01G 24/60 |

* cited by examiner

METHOD FOR MICRO-RIDGE MIXED-SOWING CULTIVATION OF RICE

CROSS REFERENCE TO THE RELATED APPLICATIONS

This application is the national phase entry of International Application No. PCT/CN2021/089813, filed on Apr. 26, 2021, which is based upon and claims priority to Chinese Patent Application No. 202010782482.6, filed on Aug. 6, 2020, the entire contents of which are incorporated herein by reference.

TECHNICAL FIELD

The present invention relates to a method for rice cultivation, and in particular to a method for micro-ridge mixed-sowing cultivation of rice.

BACKGROUND

The agricultural resources and environment in China are facing threats consisting of both exogenous pollution and endogenous pollution. In China, non-point source pollution caused by agriculture has already overtaken that from industries as a bottleneck for sustainable agricultural development. According to statistics, in 2018, the use of chemical fertilizers and pesticides in China reached 60 million tons and 300,000 tons (obtained after multiplying their NPK contents), respectively, but the utilization rate of chemical fertilizers was only about 35%. The high level of pesticide residue attendant upon the use of pesticides leads to soil degradation, nutrient loss, resource waste, environmental pollution, and reduced product quality. In China, for an average year, the total agricultural water consumption is 372 billion $m^3$, while the water consumption for rice production reaches 241.8 billion $m^3$, namely the total water consumption for rice accounts for about 65% of the total agricultural water consumption; the sowing area of rice is 30.13 million ha, and during rice farming, a field steeping water consumption of 2250 $m^3$ is generally required per ha, constituting a total consumption of field steeping water up to 67.95 billion $m^3$, which further aggravates the water shortage of rice production. The total yield of rice in China exceeds 207 million tons. Estimated according to the grain-to-stalk ratio of 1:1.2, the annual production of rice stalks exceeds 248 million tons. A stalk contains a large number of organic matters, nutrient elements such as nitrogen (N), phosphorus (P) and potassium (K), and other macro-elements and micro-elements. The N, P and K nutrient content in the 248 million tons of stalks amounts to 1.984 million tons of urea, 2.8933 million tons of superphosphate, and 2.8933 million tons of potassium sulfate. Therefore, the two measures, including dry direct-seeding without tillage and stalk fertilizer utilization, when put into practice, would produce significant water and fertilizer saving effects, thereby vigorously promoting green development. At present, rice stalks in China are prohibited from being directly burned or discarded in random piles, and thus are generally digested in situ, that is, after the rice grains are harvested, the stubble and the smashed stalks are left in situ to be shallowly buried by ploughing. In recent years, China has witnessed an increase in the yields of rice and stalks. In this regard, the stalks, if not buried shallowly, would disturb direct no-tillage, thereby affecting sowing quality. Therefore, in the context of returning rice stalks to the field in situ, how to realize no-tillage sowing remains a problem to be solved urgently. The solution to this problem plays a key role in improving the utilization rate of fertilizers and irrigation water.

An increase in the utilization rate of chemical fertilizers and pesticides can produce significant direct and indirect benefits. For instance, a one-percentage-point increase in the fertilizer utilization rate can lead to a reduction of 454,500 tons in the use of urea, a reduction of 217,300 tons in the nitrogen emission, and a saving of 454,500 tons in coal, thereby cutting down the production input by about 818 million CNY. It also facilitates reducing pesticide residues, safeguarding the quality and safety of agricultural products, and protecting the soil and water environment. Returning crop stalks to the field in situ or by mulching can effectively increase the crop yield, generally by more than 4%. Water consumption for rice production is the main part of agricultural water consumption, and thus the reduction thereof is critical to the overall situation of the agricultural water in China. Particularly, water is used intensively for field steeping of late rice and thus consumes substantially, resulting in an acute shortage of irrigation water, which frequently delays the farming season of planting the late rice, thereby affecting the yield. Additionally, some areas frequently see water disputes, which are not conducive to the construction of harmonious villages.

SUMMARY

The present invention provides a method for micro-ridge mixed-sowing cultivation of rice to solve the following technical problems: that is, to overcome the problems that during the production of rice, returning stalks to the field not only affects tillage but also has a low utilization rate, water required for field steeping is in shortage, the consumption of chemical fertilizers is high, and the topdressing time and application amount are unreasonable; to avoid the influence from the basal application of fertilizer on husk-breaking sowing; and to improve the seedling emergence rate and percentage of no-tillage and dry seeding of rice. This method can increase the utilization rate of fertilizers and reduce the consumption of field steeping water and pesticides based on the premise of no-tillage and dry seeding, thereby saving fertilizers, saving water, reducing costs, and improving soil fertility.

In order to solve the above-mentioned technical problems, the present invention adopts the following technical solutions.

A method for micro-ridge mixed-sowing cultivation of rice includes the following steps:
  S1: draining away water at a maturity stage of a preceding crop until reaching a state allowing a harvester to operate;
  S2: harvesting the preceding crop, leaving the stubble, smashing the stalks of the preceding crop, and then spreading the smashed stalks on the stubble to form a rhizosphere layer for rice growth;
  S3: trenching the field to form ecological trenches;
  S4: flattening the standing stubble and the smashed stalks on the seedbed surface to form an underlying surface; and molding seed-fertilizer-soil compounds into a ridge shape, and falling the seed-fertilizer-soil compounds on the underlying surface to form ecological ridges, wherein a plurality of ecological ridges are formed between adjacent ecological trenches, the ecological ridge is a trapezoid with a bottom width of 5.5 to 9.5 cm, a top width of 1.5 to 3.5 cm and a height of 3.5 to 6.5 cm, an ecological depression is formed between adjacent ecological ridges, and after sowing, an irrigation is carried out once in a manner, wherein the manner includes: draining water shortly after the irrigation, without leaving a water layer in the field; and the seed-fertilizer-soil compounds are obtained by thoroughly mixing rice seeds, chemical fertilizers and soil at a mass ratio of 6 to 14:50 to 70:6,000 to 10,000.

The core underlying the technical principle of the present invention is the formation of the ecological ridges, ecological depressions, and ecological trenches. Composed of organisms, nutritive bodies, and water and soil bodies, the ecological ridges have the following two functions of: (1) serving as a medium to wrap the organisms and the nutritive bodies, physically protecting the integrity of the organisms and the nutritive bodies, preserving heat and moisture, and providing water and air permeability; and (2) serving as a donor to provide water and nutritions for the organisms and the nutritive bodies. The ecological depression is composed of a sponge layer, a topsoil layer and ecological cracks to provide storage capacity for the ecological ridges, while regulating water, fertilizers, air, temperature and humidity in the ecological ridges. The ecological trench is composed of a trench body, side cracks, and bottom mud. The ecological trenches have the functions of draining and irrigating, providing raw materials for the ecological ridges, and providing channels for aquatic animals, so that grass carp, Tinca tinca, crucian carp, duck and the like can be bred in the trenches to eliminate pests and weeds for rice. In the state of no-tillage and no-irrigation dry direct-seeding, radicles and germs emerging from the seeds in the ecological ridges enjoy superior temperature and humidity conditions, and absorb the nutrients in the seeds and the compounds, thus growing faster than the weed seeds inside and outside the ridges, and growing root and leaves more smoothly. On the basis of conventional field management, ducklings are put in the initial tillering stage of rice growth to prevent diseases, pests and weeds, and compound fertilizers are applied at the booting stage. By no-tillage and no-irrigation dry direct-seeding with fertilizers and soil, the present invention significantly increases the seedling emergence percentage, remarkably increases the growth rate at the seedling stage, and obviously enhances the weed suppression ability of rice seedlings, thereby realizing zero input of pesticides at the seedling stage and zero input of field steeping water, while improving the utilization rate of water and fertilizer as well as temperature and light.

In comparison between micro-ridge mixed-sowing and hole sowing, hole sowing uses a machine to dig holes for sowing seeds, whereas micro-ridge mixed-sowing is to mix seeds, fertilizers, and soil into compounds, spread the compounds on the underlying surface, and then use a shaper to mold the compounds into a ridge shape. The trapezoid is narrow at the top and wide at the bottom to form a long ridge shape, with the same length as a plot in the field. The bottom of the trapezoid is seamlessly connected to the field surface, so that not only can water from the soil surface be channeled into the ridges under capillary action, but also can the excess unbound water in the ridges be drained to the field surface.

Gathering fertilizers and moisturizing seedlings: since the ecological ridge is formed by mixing the seeds, the chemical fertilizers, and the soil thrown up during trenching at a mass ratio of 6 to 14:50 to 70:6,000 to 10,000, the chemical fertilizers account for nearly 1% of the ecological ridge, and are evenly distributed to turn the ecological ridge into fertile soil. Therefore, the ecological ridge gathers a small amount of chemical fertilizer to become fertile soil to promote the growth of seedlings.

Further, in S3, the spacing between the adjacent ecological trenches is 1.8 to 8 m, and the ecological trench has a depth of 45 to 65 cm and a width of 10 to 18 cm.

Further, the method further includes S5: when the rice enters the initial tillering stage, putting 300 21-to-30-day-old ducklings per ha for weeding, pest control, disease prevention and control, and inter-tillage.

At the early stage of free-range rearing, the ducklings are fed with special feed. After adapting to the field environment, the ducklings obtain food mainly by grazing in the field, supplemented by food feeding. During the peak tillering stage of rice, feed is put in every late afternoon, and the feeding amount is increased as the weight of the ducklings increases.

Further, water management in a cultivation process includes: maintaining the water layer at a depth of 1 to 2 cm after the seedling emergence of rice; at the tillering stage of rice, adopting soil moisture-based irrigation, and maintaining the water layer at a depth of 2 to 4 cm; drying the field at the late tillering stage and when the number of tillers reaches 80% of the number of effective panicles; carrying out soil moisture-based irrigation at the heading-to-flowering stage and the milk stage, maintaining the water layer at a depth of 1 cm, and irrigating within 3 to 4 days after the water is exhausted; and drying the field at the yellow ripening stage.

Further, the rice seeds in S4 are germinated seeds with broken husks, and the amount of the seeds is 45 to 105 kg/ha.

Seedlings supporting for the growth of standing grains: after sowing the husk-broken rice seeds, the high concentration of chemical fertilizer in the ecological ridges is suitable for the growth of rice seedlings, as it promotes the rapid and robust growth of rice at the seedling stage, so that the stems and leaves above the ground and the underground root system expand rapidly to effectively suppress the growth of weed roots, stems and leaves, which is conducive to the early growth of standing grains and strong standing grains. Particularly, the sown seeds are rice seeds with broken husks, while the weed seeds are still in a dormant state. The early and rapid start of rice growth and the late and slow start of weed growth create a difference in their growth, which is conducive to suppressing the growth of weeds by the growth of rice as well as suppressing the growth of roots, stems and leaves of the weeds by the growth of roots, stems and leaves of rice.

Further, the soil in S4 is soil thrown up during trenching in S3.

Further, in S1, ditch cleaning and drainage are carried out at the late maturity stage of the preceding crop.

Further, the spacing within and between rows for conventional rice during sowing is 10 to 15 cm×17 to 23 cm, and the spacing within and between rows for hybrid rice is 16 to 22 cm×23 to 27 cm.

Suitable for the cultivation of rice seedlings: micro-ridge mixed sowing can be used for not only no-tillage and direct seeding, but also as a way of cultivating rice seedlings. When the micro-ridge mixed sowing is used for cultivating rice seedlings, the spacing within and between rows shall be changed accordingly, where the spacing within and between rows for conventional rice cultivation is 2 to 8 cm×4 to 12 cm, while the spacing within and between rows for hybrid rice is 3 to 12 cm×6 to 15 cm. When used for cultivating rice seedlings, micro-ridge mixed sowing has the advantage that the rice seedlings can be lifted directly with soil when transplanted or thrown, which is not only convenient for operation but also guarantees the quality of transplanting.

Further, in S3, a chain trencher is used for trenching.

Casting soil into fertilizers: the chain trencher throws up the soil in the trench and turns the soil into crushed soil, so that most of the soil becomes powder, which is conducive to the release of nutrients for the roots of the seedlings to absorb, thereby turning the soil into fertilizers.

Further, in S4, the standing stubble and the smashed stalks are flattened by using a warped pressing plate.

In S4, the seed-fertilizer-soil compounds pass through a drop guide before falling to the underlying surface; the drop guide conveys the scattered seed-fertilizer-soil compounds to a shaper, and then the trapezoid is formed through the shaper to fall on the underlying surface.

Trenching with a chain trencher is to use a chain-like trenching device to throw up the soil in the field, so as to form a trench. Most of the thrown soil becomes the materials for mixed sowing, and the materials for micro-ridge mixed sowing include three parts: rice seeds, chemical fertilizers, and soil, so as to form compounds.

On the seedbed surface between the trenches, the stubble and the smashed stalks are flattened by using the warped pressing plate to form a relatively flat underlying surface. The seed-fertilizer-soil compounds are spread in strips on the field surface. Before falling on the field surface, the seed-fertilizer-soil compounds pass through the drop guide, the drop guide conveys the scattered seed-fertilizer-soil compounds to the shaper, and after passing through the shaper and falling down, the seed-fertilizer-soil compounds form trapezoids each with a wide bottom and a narrow top, thus forming a row of micro-ridges.

Further, according to the seedling and weather conditions at the booting stage, 30 to 150 kg of compound fertilizer is applied per ha.

In the above solution, a method of controlling diseases, pests and weeds in the field includes: controlling the diseases, pests and weeds in the field mainly by ducks, but when rice diseases and pests break out over a large area, biological insecticides shall be used timely for prevention and control.

In the above solution, daily patrols are required. Particularly, during the combined farming of rice and ducks, it is necessary to observe the growing state of the ducks and inspect whether the fences are intact, thereby preventing the ducks from escaping and being injured by their natural enemies. The feeding amount is increased as the food intake of the ducks increases.

In the above solution, the micro-ridge mixed sowing shall be carried out in sunny or cloudy days immediately or in light rainy days in the later period. Meanwhile, the drainage outlet shall be opened in rainy days to prevent water accumulation in the field.

In the above solution, when sowing the seed-fertilizer-soil compounds, the seeds and fertilizers are evenly mixed with the soil to ensure that the seeds can easily absorb nutrients, while preventing the seed buds from being damaged by the excessively high concentration of chemical fertilizer under the action of the soil in the ridges. At the early stage of germination, the seed roots are isolated by soil and thus do not come into contact with the chemical fertilizers or other seeds, and the nutrients released after the decomposition of chemical fertilizers can be absorbed by the roots through the soil in the ridges.

In the above solution, during operation, the micro-ridge mixed sowing machine completes, at one time, stubble flattening and spreading, trenching, soil taking, seed-fertilizer-soil mixing, and discharge of the seed-fertilizer-soil compounds in strips into the ridges.

In the present invention, the soil in the paddy field is removed to form the ecological trenches, and the removed soil is mixed with the stubble, the stalks smashed by the harvester, the chemical fertilizers, and the germinated seeds with broken husks to form compounds for micro-ridge mixed sowing. A relatively flat underlying surface is constructed with the help of the warped pressing plate for pressing stalks. The seed-fertilizer-soil compounds are discharged through the spiral outlet of the fertilizer applicator and the seeder (i.e., the fertilizer apparatus and the seedling apparatus) for dry direct-seeding. The compounds pass through the shaper to become ridges, and an ecological depression is formed between two ridges. A configuration including the ecological ridges, the ecological depressions and the ecological trenches which are distributed orderly is formed on the water level. On the vertical plane, a seed material layer (seeds, fertilizers and soil), a stalk layer, a topsoil layer, and an exchange layer are formed from top to bottom to form a three-dimensional configuration in which water, air and fertilizers in the soil plough layer are coordinated and integrated to realize the early emergence of seedlings and the emergence of a full stand of seedlings and strong seedlings. The seeds are dry-sown in the no-tillage paddy field without the processes of field steeping and land preparation, thereby maintaining the structure of the plough layer in the paddy field, and maintaining the stability of the ecosystem of the paddy field. The stalks are completely returned to the field for utilization to reduce environmental pollution, thereby realizing efficient recycling and utilization of agricultural resources. There are three sources of water for the husk-broken rice seeds: water from the seeds themselves, water in the ridges, and water entering the ridges under the capillary action from the soil surface. There are three water retention barriers: the peel, the soil micro-aggregates attached to the surface of the grain, and the soil in the ridges, which provide more ways for the husk-broken rice seeds to absorb water, thereby reducing the impact of unfavorable factors in the external environment, and solving the problem that direct-sown rice cannot ensure a full stand of the emerging seedlings. As being uniformly distributed in the ridges, the compound fertilizers can be effectively utilized by the germinated seeds, so that the rice seedlings can quickly absorb nutrients to facilitate the formation of vigorous and strong seedlings. Ducks are adopted to control diseases, pests and weeds in the field to reduce the use of pesticides, thereby realizing green production of rice. At the middle and late stages of the growth of rice, a topdressing principle adapted to the seedlings and the field is adopted to reduce the consumption of chemical fertilizers and improve its utilization rate, while ensuring the normal growth of rice.

With the ecological ridges formed by the crushed soil during the immediate trenching, the ecological depressions formed between the ecological ridges, and the ecological trenches formed after throwing up the crushed soil, by means of no-tillage and no-irrigation dry direct-seeding with fertilizers and soil, the present invention significantly increases the seedling emergence percentage, remarkably increases the growth rate at the seedling stage, and obviously enhances the weed suppression ability of the rice seedlings, thereby realizing zero input of pesticides at the seedling stage and zero input of field steeping water, while improving the utilization rate of water and fertilizers as well as temperature and light.

The ecological ridges are composed of organisms, nutritive bodies, and water and soil bodies. The organisms are germinated seeds with broken husks, and are evenly wrapped in the ridges. The nutritive bodies are compound fertilizer granules that are not connected to the seeds, but are evenly distributed among the organisms. The water and fertilizer bodies are paddy field soils with 10% to 70% water content to be thrown up by the trencher. The ecological ridges have the following two functions of: (1) serving as a medium to wrap the organisms and the nutritive bodies, physically protecting the integrity of the organisms and the nutritive bodies, preserving heat and moisture, and providing water and air permeability; and (2) serving as a donor to provide water and nutrients for the organisms and the nutritive bodies.

The ecological depressions are composed of a sponge layer, a topsoil layer and ecological cracks. The sponge layer is the stalks left after the preceding crop is harvested, including the standing stubble which is pressed down, and the smashed stalks which are discharged by the harvester, so as to jointly form a spongy structure. The topsoil layer is located beneath the stalk layer, serves as a plough layer for the growth of the rice, provides storage capacity for the ecological ridges, and regulates water, fertilizers, air, temperature and humidity in the ecological ridges. The ecological cracks are located in the ecological depressions, and are cracks in the field. The ecological cracks serve as channels to convey oxygen and exhaust other gases. The ecological cracks are communicated with each other and are communicated with the ecological trenches to form a drainage network of the paddy field.

The ecological trench is composed of a trench body, side cracks, and bottom mud. As the main structure of the trench, the trench body is a rectangular solid to accommodate water. When the trench is full of water, the rectangular solid completely accommodates the water. When the trench is half full of water, the upper half of the rectangular solid is used for accommodating air, while the lower half of the rectangular solid is used for accommodating the water. The ecological trenches have the functions of draining and irrigating, providing raw materials for the ecological ridges, and providing channels for the aquatic animals, so that grass carp, Tinca tinca, crucian carp, duck and the like can be bred in the ecological trenches.

Compared with the prior art, the invention has the following advantages.

(1) Water saving function: the present invention realizes direct-seeding of rice without tillage, thereby saving the field steeping water required for tillage.

(2) Stalk cleaning function: after the stalks are completely returned to the field, it is difficult to carry out mechanical rotary tillage or ploughing. As a result, rice farmers have to exchange time for space, that is, to lay aside for a few days, allowing the stalks to naturally lose water and wilt to facilitate operation. In the present invention, the stalks of the preceding crop are spread on the surface of the field to form an underlying surface, which not only protects the surface layer of the field, but also provides a rhizosphere environment for the growth of the rice at the seedling stage, thereby returning the stalks to the field while improving resource utilization.

(3) Oxygen enrichment function: oxygen for rice is supplied by utilizing the thin seal of the ecological ridges and the air permeability function of the over-ground part.

(4) Function of protecting and strengthening seedlings: the micro-ridge mixed-sowing can increase ways for the husk-broken rice seeds to absorb water while promoting the germination and seedling emergence of the husk-broken rice seeds. The ecological depressions and the ecological trenches have the same length, and are adjacent but not connected. Under the capillary action and the fine crack action of the field, the subsurface water is drained when there is excess water, and water is retained in case of deficiency. An appropriate amount of fertilizer is mixed in the ridge-shaped soil wall, so that the seedlings can quickly absorb nutrients, which is conducive to the formation of vigorous and strong seedlings.

(5) Function of weed prevention and control: at the seedling stage of rice, the weeds in the field are controlled mainly based on a high position formed by the ecological ridges, supplemented by the shading effect formed by the growth of rice. At the middle stage of the growth of rice, the weeds in the field are controlled mainly based on the shading effect formed by the growth of rice, supplemented by the physical control of the ecological ridges. Ducks are used to control the weeds during the combined farming of the rice and the ducks.

(6) Functions of fertilizer saving and high yield: an appropriate amount of basal fertilizer is applied, and then fertilizers are applied depending on seedlings and moisture at the middle and later stages of the growth of rice. Particularly, 70% to 90% of the total amount of chemical fertilizers has been applied to the ecological ridges during sowing, thereby avoiding problems such as high consumption of chemical fertilizers due to volatilization loss, and unreasonable topdressing. The basal fertilizer applied at the early stage of the growth of rice is beneficial to the formation of strong seedlings, and the topdressing at the middle and the later stages depending on seedlings and moisture creates the best condition for the growth of rice, so as to lay a foundation for high yield of rice.

(7) Function of improving the utilization rate of agricultural resources: the direct-seeding in the ecological ridges realizes precise quantification of the seeds and the basal fertilizer as well as precise positioning of the sowing position to avoid the disordered state of rice seeds by traditional direct-seeding and fertilizers applied in a spread manner, thereby saving seeds and fertilizers, while avoiding soil erosion caused by sowing and drainage after tillage. The basal fertilizer can supply nutrients most directly and rapidly at the early stage of the growth of rice to gradually act on the plant root system at the middle and later stages of the growth of rice, which is conducive to the absorption and growth of the root system of rice, while improving the utilization rate of fertilizers.

(8) Function of ecological benefits: the consumption of pesticides is reduced, the energy consumption during operation is reduced, the burning of stalks is eliminated, and the occurrence of smog is lessened. The structure of the plough layer in the field is maintained, and the biodiversity of the field and the stability of the ecosystem are maintained.

DETAILED DESCRIPTION OF THE EMBODIMENTS

To make the above-mentioned technical solution more comprehensible, the above-mentioned technical solution will be described in detail below in conjunction with the drawings of the specification and the specific implementations.

EMBODIMENT

Figure 1:
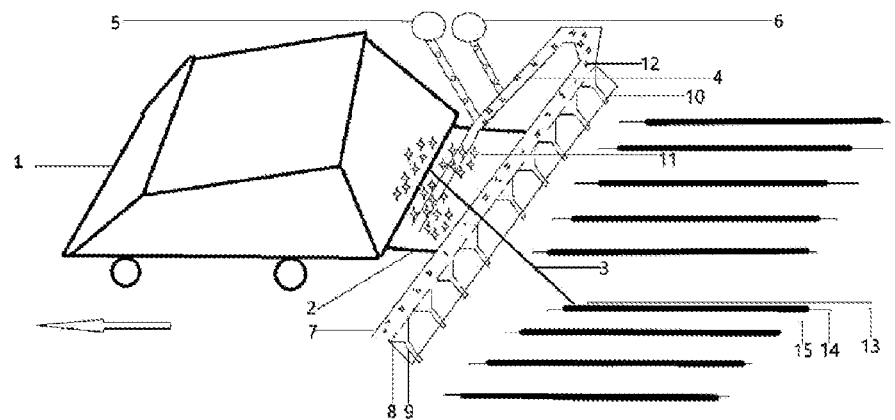
FIG. 1 is a schematic diagram of the structure of the micro-ridge mixed sowing machine.
Figure 2:
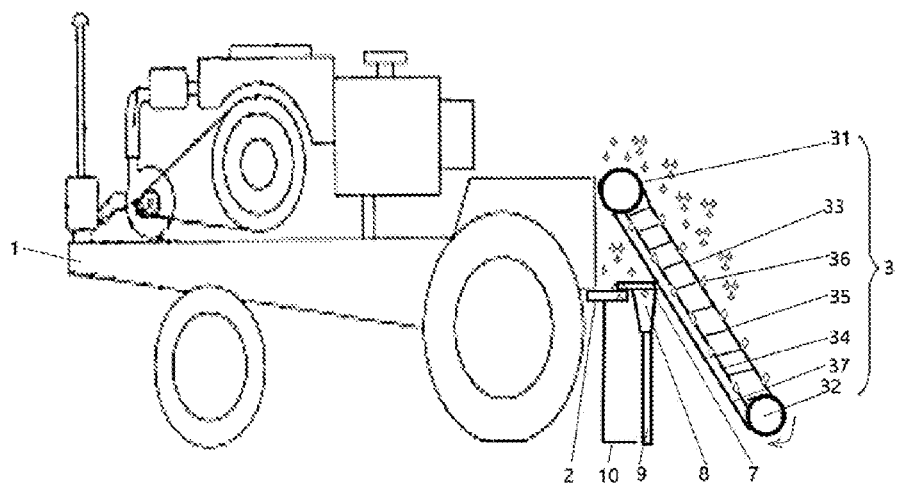
FIG. 2 is a side view of the micro-ridge mixed sowing machine.

As shown in FIG. 1 to FIG. 2, a micro-ridge mixed-sowing machine includes the tractor 1 and the link rod 2 fixedly connected to the rear of the tractor 1. The arrow in FIG. 1 indicates the heading direction of the tractor 1, and the rear of the tractor 1 refers to the direction opposite to the arrow. The tractor 1 is provided with a first driving device connected to one end of the chain trencher 3. The chain trencher 3 is arranged obliquely. The upper end of the chain trencher 3 is connected to the first driving device, and the lower end of the chain trencher 3 is in contact with the ground. The chain trencher 3 includes the driving wheel 31, the driven wheel 32, the first unloaded chain 33, the second unloaded chain 34, the chain beam 35, the scraper 36 and the load chain 37. The first unloaded chain 33 and the second unloaded chain 34 are arranged between the driving wheel 31 and the driven wheel 32 in a winding manner. There are multiple chain beams 35, which are arranged between the first unloaded chain 33 and the second unloaded chain 34. The scraper 36 is fixed outside the first unloaded chain 33 and the second unloaded chain 34. The load chain 37 is also arranged between the driving wheel 31 and the driven wheel 32 in a winding manner. The first driving device is connected to the driving wheel 31. The first driving device drives the driving wheel to rotate, thereby driving the driven wheel, the first unloaded chain, the second unloaded chain, and the load chain to rotate. The scraper digs trenches in the soil and throws up the soil. The operating parameters of the chain trencher 3 include a trench spacing of 1.8 to 8 m, a trench depth of 45 to 65 cm, and a trench width of 10 to 18 cm.

The conveyor 4 is arranged below the chain trencher 3. The upper end of the conveyor 4 is not closed to be used for receiving the thrown soil, and the conveyor 4 adopts a spiral impeller. The conveyor 4 is connected to the fertilizer apparatus 5 and the seeding apparatus 6. The conveyor 4, the fertilizer apparatus 5 and the seeding apparatus 6 are respectively driven by a second driving device, a third driving device, and a fourth driving device which are arranged on the tractor 1. The other end of the conveyor 4 is connected to the screw conveyor 7. The screw conveyor 7 is fixed on the link rod 2, and the screw conveyor 7 is driven by a fifth driving device which is arranged on the tractor 1.

The bottom of the screw conveyor 7 is sequentially connected to the drop guide 8 and the shaper 9 from top to bottom. There are multiple sets of drop guides 8 and shapers 9. The shaper 9 is a trapezoid with a bottom width of 5.5 to 11.5 cm, a top width of 1.5 to 5.5 cm, and a height of 3.5 to 9.5 cm. The distance between two adjacent sets of drop guides 8 and shapers 9 is 4 to 6 cm.

The warped pressing plate 10 includes a warped end and a horizontal end. The warped end is fixed to the link rod 2, and the horizontal end is parallel to the ground and close to the ground. The warped pressing plate 10 is L-shaped. The warped end is perpendicular to the horizontal end.

The conveyor, the fertilizer apparatus, the seeding apparatus, and the spiral conveyor are all driven by DC motors, respectively. The drop guide and the shaper have no driving device, relying on gravity, the kinetic energy of the machine during forward movement, and the coupling with the drop guide and the shaper to guide the falling and carry out the shaping for the seed-fertilizer-soil compounds.

Embodiment 1

From March, 2019 to July, 2019, micro-ridge mixed-sowing cultivation of early rice was implemented in the Quantang Subdistrict, Mingyue Village, Lukou Town, Changsha County, Changsha City, Hunan Province, China:

1. The preceding crop was Chinese cabbage, which was harvested on April 7. Ditch cleaning and drainage were carried out on that day, and the soil surface was wet but, nonetheless, the four-wheel tractor could work.

2. The broken leaves left by the cabbage stubble were not removed to serve as a rhizosphere layer for rice growth.

3. Sowing is carried out by using the micro-ridge mixed-sowing machine: 1) the chain trencher is used for trenching to throw up the soil in the field to form trenches. The trench spacing is 8 m, the trench depth is 45 cm, and the trench width is 12 cm. Most of the thrown soil becomes the raw materials for mixed sowing. The materials for sowing include rice seeds, chemical fertilizers, and soil to form compounds. When sowing, the germinated seeds with broken husks, the chemical fertilizers, and the soil thrown up during trenching are mixed at a mass ratio of 10:60:8,200 by using a mixer of the micro-ridge mixed sowing machine. The consumption of the seeds is 75 kg per ha. The seeds are sown after being mixed with 30 kg of compound fertilizer having an N:P:K ratio of 18:9:18 and the soil. During operation, the micro-ridge mixed sowing machine completes, at one time, stubble flattening and spreading, trenching, soil taking, seed-fertilizer-soil mixing, and discharge of the seed-fertilizer-soil compounds in strips into the ridges.

2) On the seedbed surface between the trenches, the broken cabbage leaves and topsoil are pressed by using the warped pressing plate installed on the micro-ridge mixed sowing machine, so as to form a relatively flat underlying surface. The seed-fertilizer-soil compounds are spread in strips on the field surface to complete the sowing. Before falling on the ground, the sown seed-fertilizer-soil compounds pass through the drop guide and the shaper to form trapezoids each with a wide bottom and a narrow top, thus forming a row of micro-ridges. The ridge has a bottom width of 6.5 cm, a top width of 1.5 cm, and a height of 3.5 cm. During operation, the micro-ridge mixed sowing machine completes, at one time, stubble flattening and spreading, trenching, soil taking, seed-fertilizer-soil mixing, and discharge of the seed-fertilizer-soil compounds in strips into the ridges. After sowing, an irrigation is carried out once in a manner, wherein the manner includes: draining water shortly after the irrigation, without leaving a water layer in the field.

4. When rice enters the initial tillering stage, 375 25-day-old ducklings are put per ha for weeding, pest control, disease prevention and control, and inter-tillage. At the early stage of free-range rearing, the ducklings are fed with special feed, with 0.01 kg per day for each duckling. After adapting to the field environment, the ducklings obtain food mainly by grazing in the field, supplemented by food feeding. During the peak tillering period of rice, compound feed is put in every late afternoon instead of the special feed. The compound feed is obtained in the following manner: mixing corn flour of 20 kg, bean dregs of 7.5 kg, oil bran of 7.5 kg, rice bran and hull of 7.5 kg, and green feed of 7.5 kg (the green feed shall be chopped) to obtain a mixture, and then adding well water of 25 kg (with probiotics of 0.25 kg) to the mixture. 0.03 kg of feed is put per duckling per day, and the feeding amount is increased as the weight of the ducklings increases. Water management is carried out in coordination with rice growth and duckling activities. After the rice seedlings emerge, the water layer is maintained at a depth of 1 to 2 cm. At the tillering stage, soil moisture-based irrigation is adopted, and the water layer is maintained at a depth of 2 to 4 cm. At the late tillering stage and when the number of tillers reaches 80% of the number of effective panicles, the field is dried appropriately until reaching a state in which the farmer can stand in the field without sinking feet into the field. At the heading-to-flowering stage and the milk stage, soil moisture-based irrigation is carried out, and the water layer is maintained at a depth of 1 cm, and an irrigation is carried out within 3 days after the water is exhausted. At the yellow ripening stage, the field is dried.

5. According to the seedling and weather conditions at the booting stage, 60 kg of compound fertilizer having an N:P:K ratio of 18:9:18 is applied per ha.

6. The early rice grew and developed normally without lodging during the entire growth period, the yield is increased, and the fertilizer consumption is decreased.

TABLE 1

Comparison table of comprehensive benefits in crop farming by comparing micro-ridge mixed-sowing cultivation with conventional cultivation of early rice

| Type | Consumption of compound fertilizer per ha (kg) | Rice yield per ha (kg) | Lodging condition | Mechanical operation cost per ha (CNY) | Compound fertilizer per ha reduced by (kg) | Mechanical operation cost per ha reduced by (CNY) | Saved cost and increased benefit per ha (CNY) |
|---|---|---|---|---|---|---|---|
| Micro-ridge mixed-sowing | 510 | 8719.5 | None | 2400 | 210 | 600 | 2270.25 |
| Conventional cultivation | 720 | 7392 | Slight | 3000 | | | |

The content clarified in the above embodiments should be construed as that these embodiments are only used to explain the present invention more clearly, rather than to limit the scope of the present invention. After reading the present invention, modifications to the present invention in various equivalent forms by those skilled in the art shall fall within the scope defined by the appended claims of the present invention.

What is claimed is:

1. A method for micro-ridge mixed-sowing cultivation of rice, comprising the following steps:
S1: draining away water at a maturity stage of a preceding crop until reaching a state allowing a harvester to operate;
S2: harvesting the preceding crop, leaving standing stubble, smashing stalks of the preceding crop to obtain smashed stalks, and then spreading the smashed stalks on the standing stubble to form a rhizosphere layer for rice growth;
S3: trenching a field to form a plurality of ecological trenches, wherein ecological trenches comprise a trench body, side cracks, and bottom mud;
S4: flattening the standing stubble and the smashed stalks on a seedbed surface to form an underlying surface; thoroughly mixing rice seeds, chemical fertilizers and soil at a mass ratio of 6 to 14:50 to 70; and 6,000 to 10,000 to produce seed-fertilizer-soil compounds, molding the seed-fertilizer-soil compounds into a ridge shape and falling the seed-fertilizer-soil compounds on the underlying surface to form a plurality of ecological ridges, wherein ecological ridges of the plurality of ecological ridges are formed between adjacent ecological trenches of the plurality of ecological trenches, each of the plurality of ecological ridges is a trapezoid with a bottom width of 5.5 cm to 9.5 cm, a top width of 1.5 cm to 3.5 cm and a height 3.5 cm to 6.5 cm, an ecological depression comprising a sponge layer, a topsoil layer, and ecological cracks is formed between adjacent ecological ridges of the plurality of ecological ridges, and after performing a sowing, an irrigation is carried out once in a manner, wherein the manner comprises: draining irrigation water shortly after the irrigation, without leaving a water layer in the field.

2. The method according to claim 1, wherein
in S3, a spacing between the adjacent ecological trenches is 1.8 m to 8 m, and each of the plurality of ecological trenches has a depth of 45 cm to 65 cm and a width of 10 cm to 18 cm.

3. The method according to claim 2, wherein
the rice seeds in S4 are germinated seeds with broken husks, and an amount of the rice seeds is 45 cm to 105 kg/ha.

4. The method according to claim 2, wherein
the soil in S4 is soil thrown up during trenching in S3.

5. The method according to claim 2, wherein
in S1, the drainage and a cleaning are carried out at a late maturity stage of the preceding crop.

6. The method according to claim 2, wherein
a spacing within and between rows for conventional rice during sowing is 10 cm to 15 cm×17 cm to 23 cm, and a spacing within and between rows for hybrid rice is 16 cm to 22 cm×23 cm to 27 cm.

7. The method according to claim 1, further comprising
S5: when the rice enters an initial tillering stage, putting 300 21-to-30-day-old ducklings per ha for weeding, pest control, disease prevention and control, and inter-tillage.

8. The method according to claim 7, wherein
the rice seeds in S4 are germinated seeds with broken husks, and an amount of the rice seeds is 45 cm to 105 kg/ha.

9. The method according to claim 7, wherein
the soil in S4 is soil thrown up during trenching in S3.

10. The method according to claim 7, wherein
in S1, the drainage and a cleaning are carried out at a late maturity stage of the preceding crop.

11. The method according to claim 1, wherein
a water management in a cultivation process comprises:
after seedling emergence of the rice, maintaining the water layer at a depth of 1 cm to 2 cm;
at a tillering stage of the rice, adopting a soil moisture-based irrigation, and maintaining the water layer at a depth of 2 cm to 4 cm;

at a late tillering stage and when a number of tillers reaches 80% of a number of effective panicles, drying the field;

at a heading-to-flowering stage and a milk stage, carrying out the soil moisture-based irrigation, maintaining the water layer at a depth of 1 cm, and irrigating within 3 to 4 days after water in the water layer is exhausted; and at a yellow ripening stage, drying the field.

12. The method according to claim 11, wherein the rice seeds in S4 are germinated seeds with broken husks, and an amount of the rice seeds is 45 cm to 105 kg/ha.

13. The method according to claim 11, wherein the soil in S4 is soil thrown up during trenching in S3.

14. The method according to claim 11, wherein in S1, the drainage and a cleaning are carried out at a late maturity stage of the preceding crop.

15. The method according to claim 1, wherein the rice seeds in S4 are germinated seeds with broken husks, and an amount of the rice seeds is 45 kg/ha to 105 kg/ha.

16. The method according to claim 1, wherein the soil in S4 is soil thrown up during trenching in S3.

17. The method according to claim 1, wherein in S1, the drainage and a cleaning are carried out at a late maturity stage of the preceding crop.

18. The method according to claim 1, wherein a spacing within and between rows for conventional rice during sowing is 10 cm to 15 cm×17 cm to 23 cm, and a spacing within and between rows for hybrid rice is 16 cm to 22 cm×23 cm to 27 cm.

19. The method according to claim 1, wherein in S3, a chain trencher is used for trenching the field.

20. The method according to claim 1, wherein in S4, the standing stubble and the smashed stalks are flattened by using a warped pressing plate;

in S4, the seed-fertilizer-soil compounds pass through a drop guide before falling to the underlying surface; the drop guide conveys the seed-fertilizer-soil compounds to a shaper, and then the trapezoid is formed through the shaper to fall on the underlying surface, wherein the seed-fertilizer-soil compounds are scattered.

* * * * *